No. 625,664. Patented May 23, 1899.
R. FINOT.
CORN PLANTER.
(Application filed Mar. 13, 1899.)
(No Model.) 2 Sheets—Sheet 1.
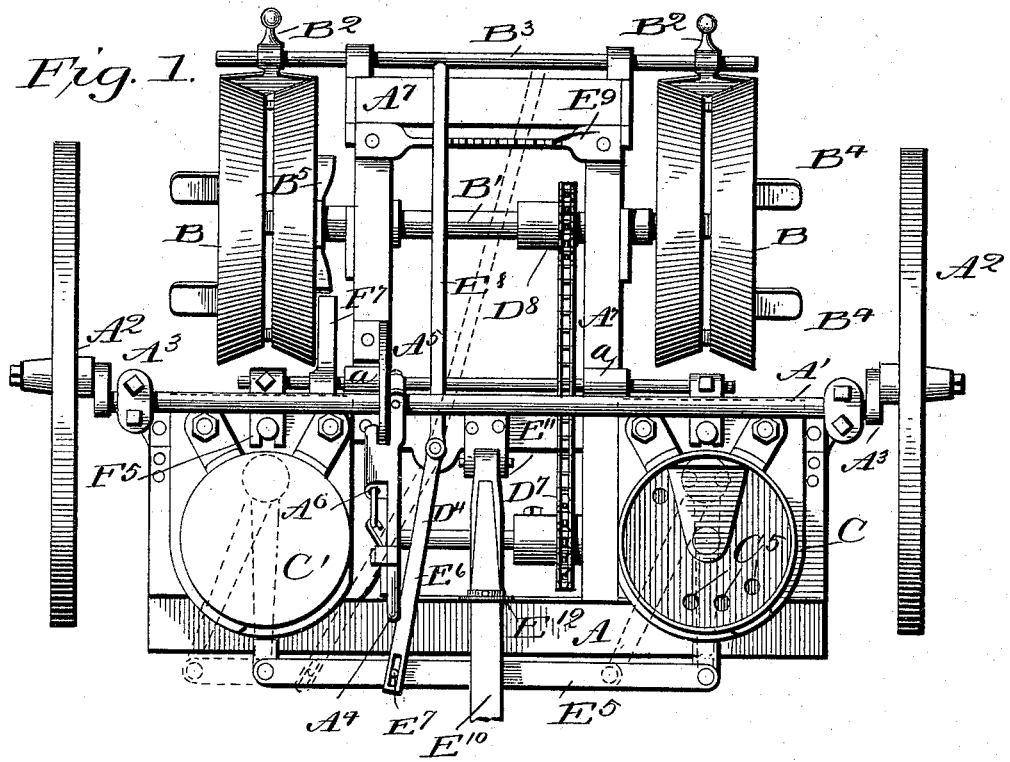
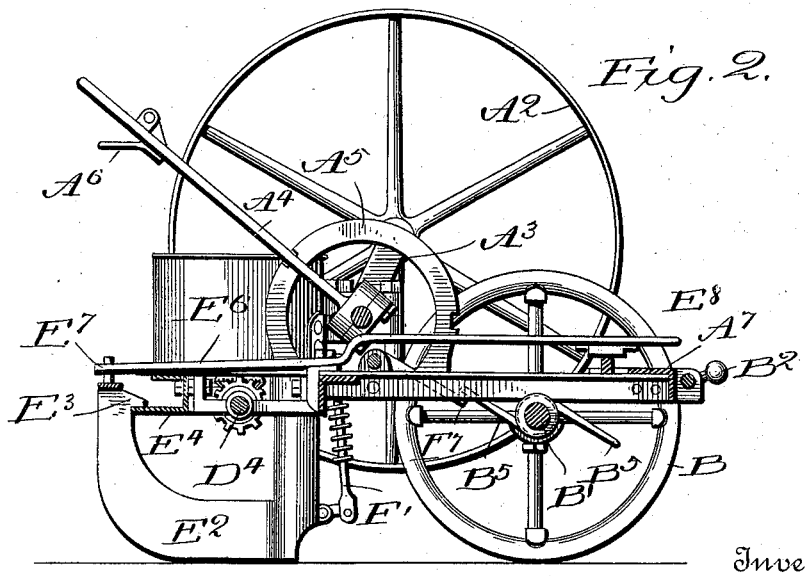
Witnesses
L. C. Hills.
Alfred T. Gage.
Inventor
Raphael Finot,
By E. B. Stocking
Attorney No. 625,664. Patented May 23, 1899.
R. FINOT.
CORN PLANTER.
(Application filed Mar. 13, 1899.)
(No Model.) 2 Sheets—Sheet 2.
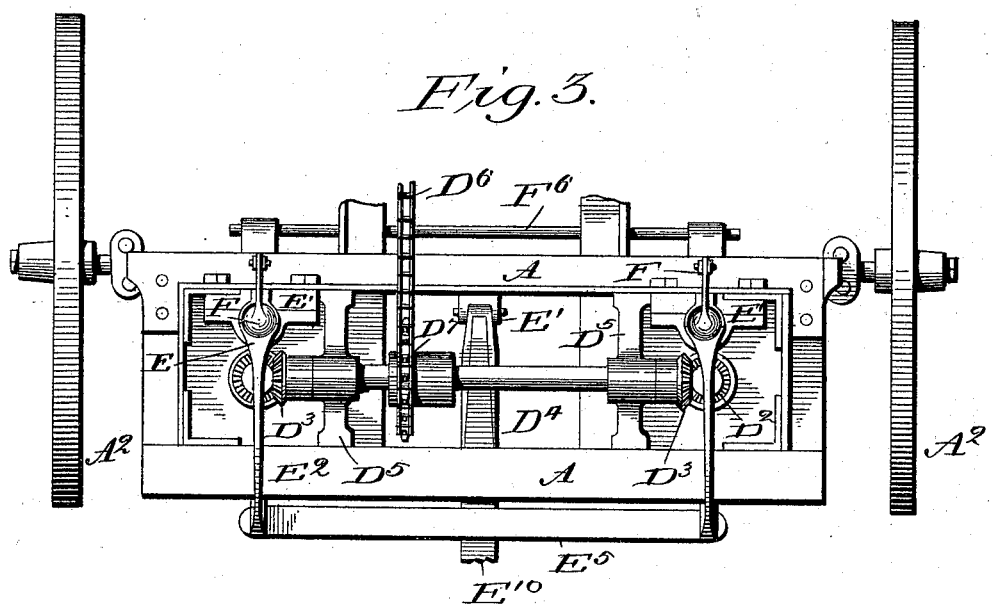
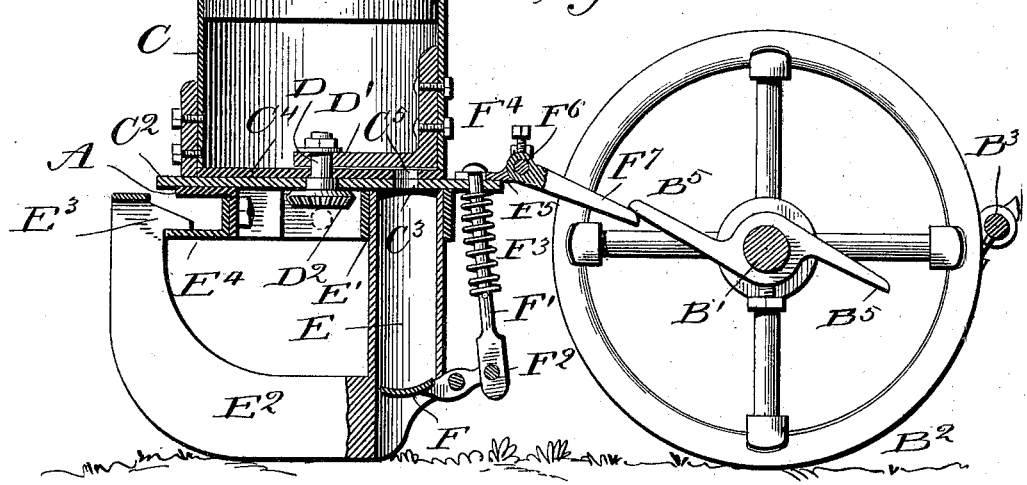
Witnesses
L. C. Hills
Alfred T. Gage
Inventor:
Raphael Finot,
By E. B. Stocking
Attorney

UNITED STATES PATENT OFFICE.

RAPHAËL FINOT, OF MURPHYSBOROUGH, ILLINOIS.

CORN-PLANTER.

SPECIFICATION forming part of Letters Patent No. 625,664, dated May 23, 1899.

Application filed March 13, 1899. Serial No. 708,870. (No model.)

*To all whom it may concern:*

Be it known that I, RAPHAËL FINOT, a citizen of the United States, residing at Murphysborough, in the county of Jackson, State of Illinois, have invented certain new and useful Improvements in Corn-Planters, of which the following is a specification, reference being had therein to the accompanying drawings.

This invention relates to corn-planters, and particularly to an apparatus adapted to deposit the corn at regular intervals in what are known as "check-rows" and without the use of a fixed line or chain to effect such regular planting.

The invention has for an object to perfect the structure of plow and drill, so that the planter may be capable of efficient operation both upon a level surface and upon a sidehill.

A further object of the invention is to provide an improved marking or checking device operating in connection with a seed-dropper of improved construction whereby the combination of parts produces an efficient and economically-constructed planter.

Other objects and advantages of the invention will hereinafter appear in the following description, and the novel features thereof will be particularly pointed out in the appended claims.

In the drawings, Figure 1 is a plan view with the top of one of the seedboxes removed. Fig. 2 is a vertical section through Fig. 1 with the carrier-wheels removed from the ground. Fig. 3 is a bottom plan of the front frame and seed-dropping mechanism, and Fig. 4 is a vertical section through one of the seedboxes and the coöperating parts.

Like letters of reference indicate like parts throughout the several figures of the drawings.

The letter A designates the front frame of the machine, which is suitably supported for transportation upon an axle $A'$ and carrier-wheels $A^2$, mounted upon crank-arms $A^3$, extending from the axle $A'$. Upon the axle $A'$ a lever $A^4$ is secured, which operates in connection with a segment $A^5$, secured to the frame A, and is locked in its adjusted position by means of a suitable latch mechanism $A^6$. It will be seen that when the lever is thrown to one extreme of its movement the carrier-wheels $A^2$ will be lifted from the ground, as shown in Fig. 2, while if the lever $A^4$ be shifted to the opposite limit of its movement and there latched the carrier-wheels will lift the planter from the ground, so that the same may be transported.

From opposite sides of the center of the frame A a rear frame $A^7$ extends and has journaled therein the covering-wheels B. These wheels are mounted upon a shaft $B'$ and are provided with beveled faces separated by a space at their adjacent edges. Suitable weighted scrapers $B^2$ are pivotally mounted upon a rod $B^3$, carried by the frame $A^7$ and adapted to ride upon the covering-wheels and remove from the same any adhering soil. These wheels are also provided at opposite points with markers $B^4$, which extend laterally from their peripheries, to indicate the point where the seed is dropped or planted and are located relatively to the tappet $B^5$, which may be carried by one of the wheels or its shaft for the purpose of actuating the seed-dropping mechanism.

The seedboxes C are mounted upon the front frame A and provided with suitable removable covers $C'$. At the base of said boxes a plate $C^2$ is provided having a feed-aperture $C^3$, and above this plate a rotatable pocketed disk $C^4$ is journaled and has therein a series of pockets $C^5$, adapted to receive the seed and carry the same over the aperture $C^3$, through which it may be discharged. This rotatable disk is actuated from a shaft D, pivotally mounted in a suitable arm $D'$, carried by the seedbox C, which shaft has at its lower end a beveled gear $D^2$, meshing with a similar gear $D^3$ upon the shaft $D^4$, which extends to each of the seedboxes. This shaft is suitably supported in bearings $D^5$, carried by the frame A, and is actuated by means of a chain $D^6$, geared to a sprocket $D^7$, carried upon the shaft $D^4$, and to a similar sprocket $D^8$, carried upon the shaft $B'$. It is obvious that the diameters or number of teeth in these sprockets may be altered to vary the speed of rotation imparted to the shaft $D^4$ and the corresponding feed.

Beneath the feed-aperture $C^3$ the seed-tubes E are removably supported within bearings $E'$, and to the forward portion of this tube the plow or furrower $E^2$ is connected. The seed-tube and plow are thus rotatable for the purpose of plowing on sidehills or similar inclined surfaces. The upper portion of the plow is provided with a guiding-lug $E^3$, coöperating with a flange $E^4$, carried by the frame A, and the plows upon opposite sides are connected together by means of a cross-bar $E^5$. For the purpose of shifting this bar and the two plows simultaneously, as indicated by dotted lines in Fig. 1, a lever $E^6$ is pivotally mounted upon the frame A and connected to the bar $E^5$ by a suitable connection—for instance, a pin and slot $E^7$—while the handle $E^8$ coöperates with a horizontally-disposed rack-bar $E^9$, supported upon the rear frame $A^7$, whereby the plows may be shifted and held at any desired angle relative to the pole $E^{10}$. This pole is pivotally supported at $E^{11}$ and operates within a bail or keeper $E^{12}$.

Pivotally mounted within the seed-tube E is a suitable seed-valve F, having its outer end connected to the seed-dropping mechanism. This mechanism consists of a link $F'$, pivoted at its lower end to the valve F, as at $F^2$, and surrounded by a spring $F^3$, one end of said spring being connected to the link $F'$ and the opposite end bearing against the under face of the front frame A. The upper end of the link $F'$ is provided with a suitable head $F^4$, and beneath this head a crank-arm $F^5$, secured to the shaft $F^6$, extends. This shaft is supported in suitable bearings $a$ upon the frame A and is provided with an adjustable arm $F^7$, coöperating with the tappet $B^5$, carried by the shaft $B'$. A depression of the arm $F^7$ elevates the arm $F^5$ and oscillates the valve F to drop the seed, and as soon as the arm $F^7$ passes the tappet $B^5$ the spring $F^3$, which has been under compression, expands and immediately raises the valve F to catch and retain the seed within the tube E until again operated to drop the seed.

The general operation of the several parts will be clearly understood from the foregoing description; but it may be stated in addition that when the planter is used upon a sidehill or other inclined surface the plows will be shifted in the direction of the upward incline, thus causing the machine to travel in a straight line and to properly space and plant the seed, which does not occur if the plows be retained in a fixed relation or a straight line with the line of movement, as the drag or shift of the planter on the ground quickly changes its position, and consequently the alinement of the rows is destroyed and the planting rendered imperfect and irregular. It will further be seen that the markers carried by the covering-wheels will indicate the position of the first and all subsequent hills, so that in beginning a second or further row across a field the first hill is dropped in alinement with the previously-planted seed, and the remaining hills will be in their proper position relative to the seed previously planted. Whenever it is desired to transport the machine, the carrier-wheels can be readily brought into position to lift and support the plows above the level of the ground.

It is obvious that changes may be made in the details of construction and configuration of the several parts without departing from the spirit of this invention as defined by the appended claims.

Having described my invention and set forth its merits, what I claim as new, and desire to secure by Letters Patent, is—

1. In a planter, the combination with a frame, of a plow pivotally supported by a fixed part at one end and free to oscillate independently of said frame, and means for adjusting the angle of said plow transversely to the frame; substantially as specified.

2. In a planter, the combination with a frame, of a plow pivotally supported thereby and adapted to oscillate independently of said frame, and a pivoted adjusting-lever adapted to oscillate said plow transversely to the frame; substantially as specified.

3. In a planter, the combination with a frame, of oppositely-located pivoted plows, a reciprocating cross-bar connecting the free end of said plows, a lever pivoted upon the frame and engaging said cross-bar, and means to retain said lever in its adjusted position; substantially as specified.

4. In a planter, the combination with a frame, of a plow having a pivoted seed-tube mounted in said frame, means to oscillate said plow independently of said frame, a seed-valve mounted in said tube, and means for operating said valve; substantially as specified.

5. In a planter, the combination with a frame provided with seed-dropping mechanism, a covering-wheel in line with said mechanism, a tappet independent of and rotatable with said wheel, a seed-valve in said dropping mechanism, a link extending from said seed-valve through a fixed part of said frame, a spring surrounding said link and compressible against a portion of said frame, a rock-shaft having an angle-arm engaging the upper end of said link above the frame, and a finger adapted to be engaged and operated by said tappet; substantially as specified.

6. In a planter, the combination with a frame provided with seed-dropping mechanism, a covering-wheel in line with said mechanism, a tappet independent of and rotatable with said wheel, a seed-valve in said dropping mechanism, a link extending from said seed-valve through a fixed part of said frame, a spring surrounding said link and compressible against a portion of said frame, a rock-shaft having an angle-arm engaging the upper end of said link above the frame, a finger adapted to be engaged and operated by said tappet, a seedbox having therein a rotatable disk, a shaft for rotating said disk, and a sprocket-chain extending to the shaft of said covering-wheel; substantially as specified.

7. In a planter, the combination with a frame provided with seed-dropping mechanism, a covering-wheel in a line with said mechanism, a tappet rotatable with said wheel, a seed-valve in said dropping mechanism, a link extending from said seed-valve, a spring secured to said link and bearing against a portion of said frame, a rock-shaft having an angle-arm engaging the upper end of said link, a finger adapted to be engaged and operated by said tappet, a seedbox having therein a rotatable disk, a shaft for rotating said disk, a sprocket-chain extending to the shaft of said covering-wheel, a laterally-extending marker from the periphery of said covering-wheel, an axle pivotally mounted in the frame and having crank portions at its opposite ends, carrier-wheels mounted upon said crank portions, and means for retaining said axle in its adjusted position; substantially as specified.

8. In a planter, the combination with a frame, of a seedbox located thereon and having a discharge-aperture, a seed-tube pivotally mounted beneath said aperture, a plow extending from said tube and provided with a guiding-lug, a flange carried by the frame and coöperating with said lug, and means for shifting said plow; substantially as specified.

In testimony whereof I affix my signature in presence of two witnesses.

RAPHAËL FINOT.

Witnesses:
DOMINIC AIMO,
JOSEPH POIROT.